United States Patent [19]
Barlow et al.

[11] Patent Number: 5,914,015
[45] Date of Patent: Jun. 22, 1999

[54] METHOD AND APPARATUS FOR PROCESSING EXHAUST GAS WITH CORONA DISCHARGE

[75] Inventors: Stephan E. Barlow, Richland; Thomas M. Orlando; Russell G. Tonkyn, both of Kennewick, all of Wash.

[73] Assignee: Battelle Memorial Institute, Richland, Wash.

[21] Appl. No.: 08/680,420

[22] Filed: Jul. 15, 1996

[51] Int. Cl.⁶ ................................ B01J 19/08
[52] U.S. Cl. .................. 204/177; 204/164; 422/186.04; 588/227
[58] Field of Search ............... 422/186.04; 204/164, 204/177; 588/210, 212, 227

[56] References Cited

U.S. PATENT DOCUMENTS

| | | | |
|---|---|---|---|
| 4,954,320 | 9/1990 | Birmingham et al. | 422/186.04 |
| 5,524,231 | 6/1996 | Heath et al. | 204/164 |
| 5,609,736 | 3/1997 | Yamamoto | 204/164 |

FOREIGN PATENT DOCUMENTS

| | | | |
|---|---|---|---|
| 0 659 465 A2 | 6/1995 | European Pat. Off. | 53/32 |
| 43 38 995 A1 | 6/1994 | Germany . | |
| 195 10 804 A1 | 3/1995 | Germany | 53/94 |
| 94 07 861 U1 | 10/1995 | Germany | 53/86 |
| 44 16 676 A1 | 11/1995 | Germany | 53/86 |
| 195 18 970 C1 | 11/1996 | Germany | 53/94 |
| 5-115746 | 5/1993 | Japan . | |
| 6-269635 | 9/1994 | Japan . | |
| 7-116460 | 5/1995 | Japan . | |

*Primary Examiner*—K. Mayekar
*Attorney, Agent, or Firm*—Paul W. Zimmerman

[57] ABSTRACT

The present invention is placing a catalyst coating upon surfaces surrounding a volume containing corona discharge. In addition, the electrodes are coated with a robust dielectric material. Further, the electrodes are arranged so that at least a surface portion of each electrode extends into a flow path of the exhaust gas to be treated and there is only exhaust gas in the volume between each pair of electrodes.

28 Claims, 4 Drawing Sheets

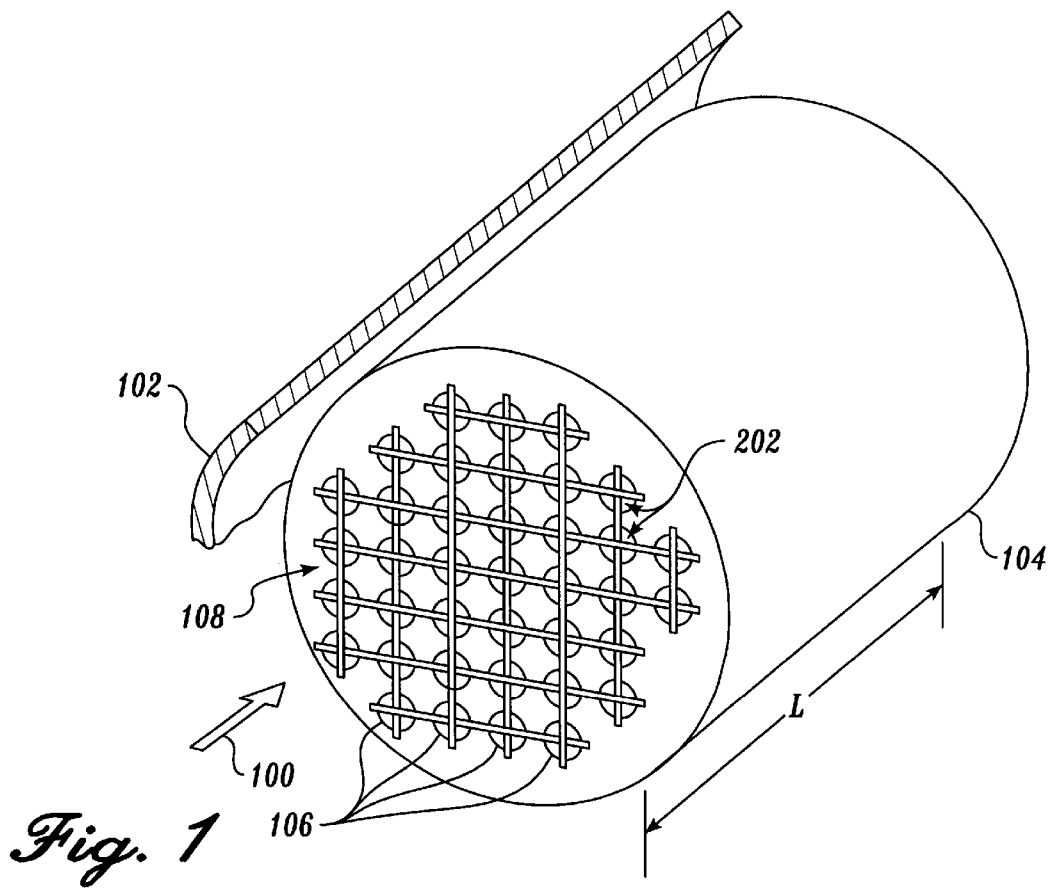
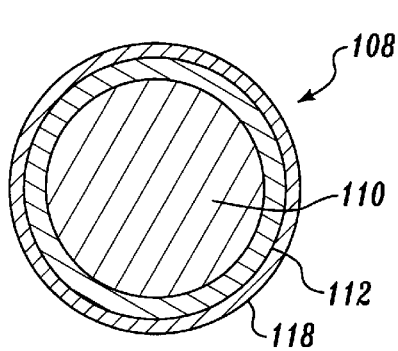
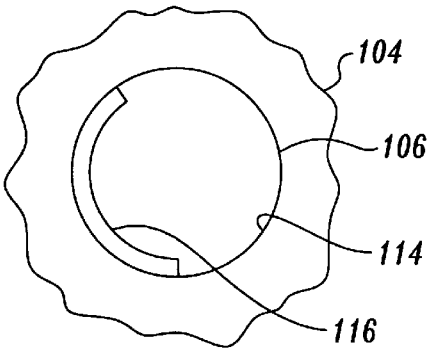
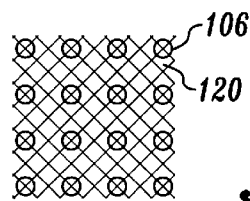

METHOD AND APPARATUS FOR PROCESSING EXHAUST GAS WITH CORONA DISCHARGE

This invention was made with Government support under Contract DE-AC06 76RLO 1830 awarded by the U.S. Department of Energy. The Government has certain rights in the invention.

FIELD OF THE INVENTION

The present invention relates generally to a method and apparatus for processing exhaust gas with corona discharge. More specifically, the invention is the combination of corona discharge in the presence of a surface catalyst.

BACKGROUND OF THE INVENTION

Processing of exhaust gas is of increasing importance since highly populated areas accumulate impurities from exhaust gases that are harmful to human health and are unsightly. Of specific interest is processing of combustion exhaust, and more specifically, processing of automobile combustion exhaust as well as industrial process combustion exhaust.

Glow discharge or corona discharge has been exploited for exhaust gas processing. Japanese patent JP 6-269635, S. Nishida et al., shows equipment for $NO_x$ removal from combustion exhaust. Nishida et al. discuss a chamber containing many electrodes in the form of dielectric coated rods placed parallel to one another and perpendicular to the flow of combustion exhaust within the chamber. Nishida et al. improved the chamber by forming rectangular subchambers with walls of the subchambers made of dielectric coated sheet electrode material. The walls are parallel to the flow of combustion exhaust for reducing pressure drop past the electrodes and accommodating higher exhaust gas flow rates. Complete destruction of $NO_x$ is reported to require electrical power from about 1100 Watt to about 2100 Watt, for gas flow rates of about 1000 m³N/h and $NO_x$ concentration from about 20 ppm to about 200 ppm (4–7.6 W/l/sec).

Another Japanese patent, JP 7-116460, S. Nishida et al., describes an exhaust gas reactor having a flat electrode and a sawtooth electrode juxtaposed with exhaust gas flowing therebetween. High voltage applied to the electrodes creates a charge in the exhaust gas. The reactor is capable of removing about 80 to 90% of the $NO_x$ at a flow rate of about 100 l/min for concentrations of $NO_x$ from about 50 ppm to about 200 ppm. However, when the $O_2$ concentration in the exhaust gas exceeds several per cent, the $NO_x$ is oxidized and the $NO_x$ removal rate is degraded. By adding a carbon layer to the downstream portion of the flat electrode, increased concentrations of $O_2$ do not affect $NO_x$ removal. However, the carbon layer becomes oxidized and eventually requires replacement.

A third Japanese patent, JP 5-115746, S. Nishida et al., discusses a concentric electrode chamber with an outer cylinder electrode and an inner rod electrode with exhaust gas flowing through the annulus therebetween. It is stated that this concentric electrode chamber is limited to a flow rate of about 60 l/min before the glow discharge is extinguished. Nishida et al. introduce a sawtooth with pitch of the saw tooth increasing in the direction of flow to maintain the glow discharge at flow rates as high as 1000 l/min. The amount of electrical power consumed to achieve 100% $NO_x$ destruction for that flow rate was not reported.

A U.S. Pat. No. 4,954,320 to Birmingham et al., discusses a concentric electrode air purification device wherein the annulus between the electrodes is filled with dielectric beads having a dielectric constant greater than about 33. Electric power consumed is reported as about 10 kW and near 100% destruction of cyanogen and phosgene at flow rates of 2.6 standard cubic feet per minute (scfm) (1.23 l/s) and 5.5 scfm (2.6 l/s) respectively (3.8–9.3 kW/l/s).

A second U.S. Pat. No. 5,254,231 to Heath et al., discusses a concentric electrode gas modification system wherein the annulus between the electrodes is filled with dielectric beads having a dielectric constant of less than 33. Electric power consumed is estimated to be from 60 to 700 Watt for nearly 100% destruction of 205 ppm trichloroethylene in air at 1.8 scfm (51 l/s) (1.2–13.7 W/l/s). Although not specifically reported, the pressure drop across the dielectric beads is significantly greater than the pressure drop through an open annulus.

Accordingly, there remains a need for an exhaust gas processing method and apparatus that achieves near 100% impurity removal with both reduced electrical power and reduced pressure drop of exhaust gas flow through an exhaust gas processing chamber.

SUMMARY OF THE INVENTION

It is an object of the present invention to provide near 100% impurity removal from exhaust gas with reduced electrical power and reduced pressure drop through an exhaust gas processing chamber.

It is a further object of the present invention to provide alternating reductive and oxidative zones for exhaust gas processing.

These and other objects are achieved by placing a catalyst coating upon surfaces surrounding a volume containing corona discharge. In addition, the electrodes are coated with a robust dielectric material. Further, the electrodes are arranged so that at least a surface portion of each electrode extends into a flow path of the exhaust gas to be treated and there is only exhaust gas in the flow path volume between each pair of electrodes.

Advantages of the invention include lower corona initiation voltage, as low as 1 kV, and lower temperature destruction of exhaust gas at temperatures below 500° C. A further advantage is that the invention is not limited to low temperature operation but will also perform well at temperatures in excess of 500° C.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

BRIEF DESCRIPTION OF THE DRAWINGS

FIG. 1 is an isometric of a perforated monolith according to the present invention.

FIG. 1a is a cross section of an electrode.

FIG. 1b is a detail of a flow passage.

FIG. 1c is a front view of a perforated monolith with a non-symmetric electrode.

DESCRIPTION OF THE PREFERRED EMBODIMENT(S)

Figure 2:
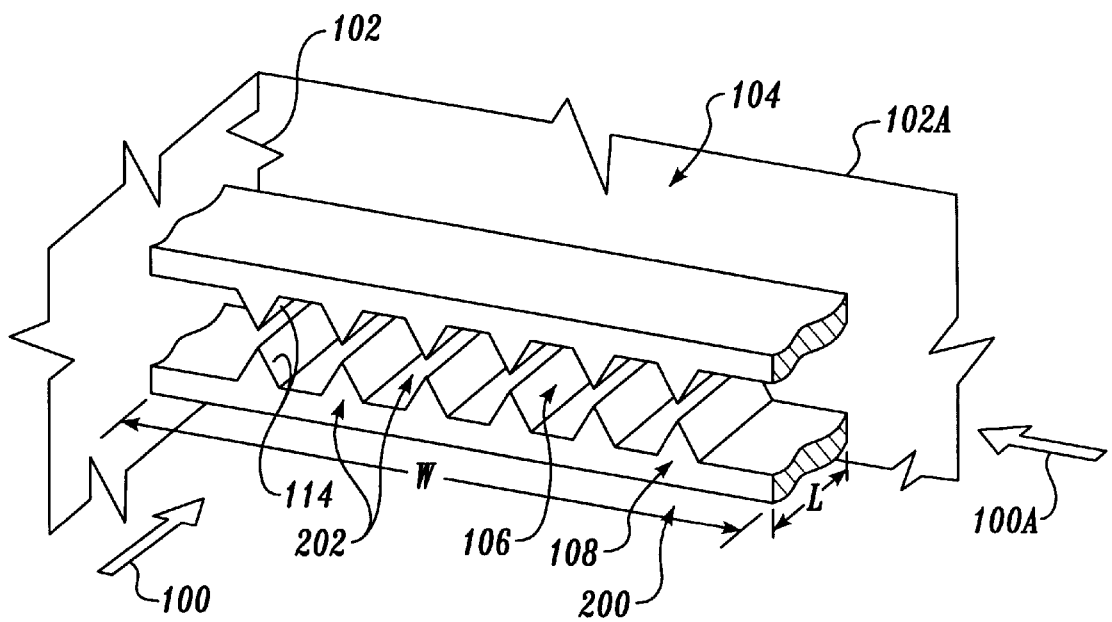
FIG. 2 is an isometric of parallel elements according to the present invention.

The apparatus of the present invention is an apparatus for applying a plasma or corona discharge to an exhaust gas. The apparatus has a housing with interior surfaces defining at least one volume through which the exhaust gas flows. The housing contains a first electrode and a second electrode that are spaced apart so that the exhaust gas flows between them. The advantages of the present invention are realized upon coating the electrodes with a dielectric material and coating the interior surfaces with a catalyst material. The dielectric coating substantially reduces or eliminates arcing or sparks. Alternating current is used exclusively to avoid charge buildup on the dielectric coating.

The dielectric coating must have a dielectric strength sufficient to resist breakdown at voltages from about 1 kV to about 35 kV used to initiate and maintain the corona discharge or plasma. Dielectric strength is preferably at least about 200 V/mil. The coating must adhere strongly to the electrode material as well as be thermally, chemically, and mechanically stable. Preferred dielectric coatings are coatable onto desired electrode geometries, are readily available and can be economically placed on the electrode material.

The electrodes may be embedded in the interior surface(s) of the housing so that the electrode has a coating of dielectric material and the dielectric material has a coating of catalyst material. Alternatively (FIG. 1, FIG. 1a, FIG. 1b, FIG. 1c, the housing may be a ceramic material having interior flow passages, for example Cordierite, that is coated with a catalyst material and the electrodes may be one or more wires making a plurality of passes over openings to the interior flow passages with the electrodes bearing a dielectric coating. Alternatively, the electrodes may be flat stock or perforated plate. It is important to note that in a preferred embodiment, the electrodes passing over the openings are non-symmetric with respect to the hole pattern, or the hole pattern is non-symmetric with respect to the electrodes. It is further important that in the preferred embodiment that the number of openings through the electrodes be greater than the number of holes through the monolith. With a non-symmetric geometric relationship between the electrodes and the holes, the corona is more evenly and fully distributed among and within the holes. With a greater number of openings through the electrodes than holes through the monolith, corona discharge is present within all of the holes so that no exhaust passes through the monolith that is not exposed to corona discharge.

Preferred electrode materials include metals including but not limited to stainless steel and aluminum. Preferred dielectric coatings include but are not limited to oxides, for example $ZrO_2$, $TiO_2$, $Cr_2O_3$, and/or fused silica, zeolites, ferroelectrics, perovskites or combinations thereof. A metal oxide is preferred because it may be deposited in thicknesses as small as $10^{-4}$ mm. It is further preferred that the metal of the metal oxide be contained as an element in the electrode. For example, since chromium is an element of stainless steel, chrome oxide is a preferred dielectric coating. Coatings up to 1 mm are acceptable as achievable using fused silica. Certain oxides may also act as absorbent or gettering material, for example $ZrO_2$, $CeO_2$, and combinations thereof.

Preferred catalyst materials include but are not limited to oxides, nitrides, titanates, and zeolites which may also act as a dielectric barrier. Again, certain oxides may act as absorbent or gettering material.

Referring to FIG. 1, exhaust gas 100 denoted by the arrow contained within a flow passage 102 flows through the housing 104 through parallel passages 106. Parallel passages 106 extend through the length L of the housing 104. Electrodes 108 are placed on both ends of the housing 104 so that the exhaust gas 100 flows between them. The electrodes 108 have an electrically conductive core 110 coated with a dielectric ceramic 112 as shown in FIG. 1a. The parallel passages 106 have interior surfaces 114 coated with a catalyst material 116. The catalyst material 116 may partially cover the interior surface 114 as shown or completely cover the interior surface 114. In addition, a protective layer 118 may be added. The protective layer 118 is preferably another metal oxide, for example aluminum oxide.

Figure 2A:
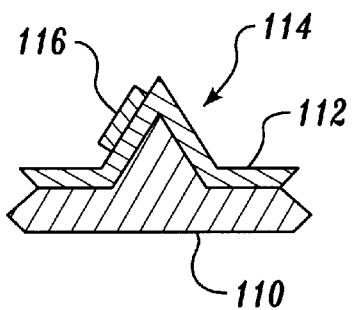
FIG. 2a is a cross section of a projection with a partial catalyst coating.
Figure 2B:
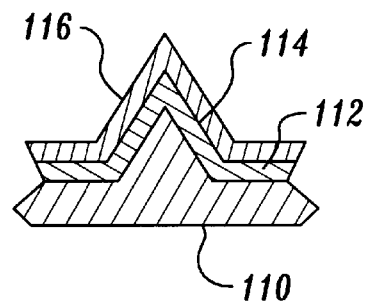
FIG. 2b is a cross section of a projection with a full catalyst coating.

An alternative embodiment is shown in FIG. 2. Exhaust gas 100 contained within a flow passage 102 flows through the housing 104 through parallel passages 106. Parallel passages 106 extend through the length L of the housing 104. Alternatively, exhaust gas 100a flows within a flow passage 102a through parallel passages 106 through the width W of the housing 104. Electrodes 108 form walls 200 of the housing 104 so that the exhaust gas 100 flows between them. The electrodes 108 have an electrically conductive core 110 coated with a dielectric ceramic 112 as shown in FIG. 2a. The dielectric ceramic 112 are interior surfaces 114 coated with a catalyst material 116. The catalyst material 116 may partially cover the interior surface 114 as shown in FIG. 2a or completely cover the interior surface 114 as shown in FIG. 2b.

In either embodiment as shown in FIG. 1 or FIG. 2, each electrode 108 has a projection 202 extended into or across a portion of the flow cross section (flow passages 106). Each electrode 108 is attached to the housing 104.

In addition, according to the present invention, the flow passages 106 are open. In other words, the flow passages 106 are not filled with loose material, beads, granules or other solid materials. Maintaining open flow passages 106 permits free flow of exhaust gas with a minimum of pressure drop as the exhaust gas passes through the flow passages 106. The flow passages 106 may be holes through a monolith housing 104 as shown in FIG. 1 or a gap or space between parallel members as a housing 104 as shown in FIG. 2. Holes or gaps may be of any cross sectional shape and/or any variation of shape.

The apparatus of the present invention therefore further includes, (a) the housing 104 having a plurality of parallel passages 106 through which the exhaust gas 100 flows;

(b) each parallel passage 106 having a flow cross section and at least one pair of the electrodes 108 of the first electrode and the second electrode wherein each of the at least one pair of electrodes 108 has a projection 202 extended into or across a portion of the flow cross section, with each electrode 108 attached to the housing 104.

By selecting certain catalysts for the catalyst layer 116, an apparatus may be oxidizing and/or reducing. In addition, two or more of the apparatus may be placed in series thereby achieving alternate oxidative and reductive treatment of an exhaust stream. Further, placing two or more of the apparatus in parallel permits oxidative and reductive treatment of parallel substreams of the exhaust gas wherein recombining the parallel substreams may result in further reaction or neutralization of the exhaust gas.

An additional feature of the present invention is the ability to control spatial and temporal domains of reductive and oxidative reactions through design of electrical discharge position and intensity, gas flow velocity, and catalyst and/or absorbing or gettering material coating. It is preferred to maximize reductive reactions to more completely convert gaseous oxides, for example nitrogen oxides, to gaseous non-oxides, e.g. $N_2$. Control of the temporal domain may be accomplished by pulsed discharge, or by quasi-continuous multiple discharges at separated locations. In the present invention is it preferred to use quasi-continuous multiple discharges at separate locations to eliminate the need to produce and control pulses.

Figure 3:
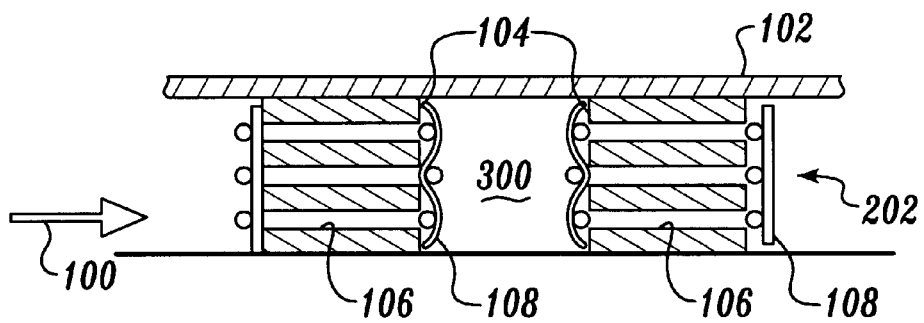
FIG. 3 is a cross section of a perforated monolith.
Figure 4:
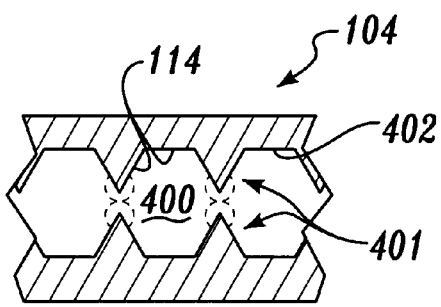
FIG. 4 is a cross section of parallel elements of open tooth arrangement.

For the apparatus shown in FIG. 1, quasi-continuous multiple discharges at separate locations is preferably achieved by placing apparati in series. As shown in FIG. 3, the space between them 300 is a discharge free zone containing substantially no plasma or corona discharge. Alternatively, as shown in FIG. 4, a discharge free zone or substantially discharge free zone may be achieved in the cavity 400 defined between the inner surfaces 114 of the housing 104. The electric field strengths and discharge densities will be greatest in near proximity of the peaks, points or projections 202 and reduced or minimal in the cavity 400 between the projections 202. It is preferred, therefore that the gas be in crossflow 100a with respect to the orientation of the projections 202, or that if in parallel flow, that at least two apparatis be placed offset so that the projections 202 of one are aligned with the cavities 400 of the other. The residence time of the gas in the discharge and discharge free zones together with the coatings determines the extent of oxidative reactions.

Figure 4A:
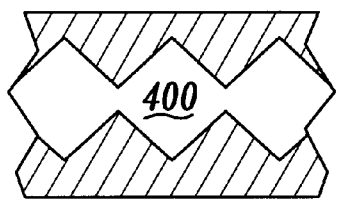
FIG. 4a is a cross section of parallel elements of sawtooth arrangement.
Figure 4B:
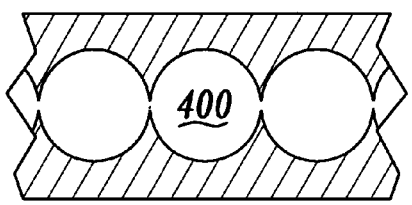
FIG. 4b is a cross section of parallel elements of cusp arrangement.

The shape of the electrodes 108 is not critical. Throughout FIGS. 1, and 3, the electrodes 108 are shown as a mesh that may be woven or non-woven. What is important is that a projection 202 cover a portion of the flow path of the exhaust gas. Instead of mesh elements as strips, wires or rods, a single sheet drilled or machined to form a cross hatched pattern would be sufficient. It is important that the electrode be as near the opening to the parallel passage 106 as possible so that the plasma or discharge is contained within the parallel passage 106. It is also important to minimize pressure drop of the exhaust gas. Accordingly, it is preferred that the projections 202 of the electrodes 108 have as small a cross section as possible. Further, for the monolith, it is preferred that the electrode spacing be non-symmetric with the hole spacing as illustrated in FIG. 1c. Further, it is preferred that the number of openings 120 through the electrodes be greater than the number of holes 106 so that corona discharge occurs in all holes 106. For the electrode shape shown in FIGS. 2 and 4, the open tooth design shown minimizes the voltage required to produce a plasma throughout the entire volume 400 compared to the sawtooth design FIG. 4a and the cusp design FIG. 4b. In this context, the term "open tooth" refers to a distance between adjacent teeth 401, specifically the horizontal surface 402 between teeth 202.

In operation, the present invention permits achieving a plasma or discharge at an applied voltage much lower than achieved with known methods. Specifically, the present invention achieves plasma or discharge at a voltage less than about 12 kV and is preferable operated at less than about 10 kV and most preferably between about 1 kV and about 9 kV.

EXAMPLE 1

An experiment was conducted to compare the performance of the perforated monolith of the present invention to the performance of a packed-bed reactor familiar to those of skill in the art of processing exhaust gas with corona discharge.

The monolith used was an automobile catalyst that had a cordierite base (brick) without a precious metal washcoat. A 6.4 cm (2.5 inch) core was cut from the brick and sectioned into a 1 cm thick slice. The holes were about 1 mm square/diamond through on about 2 mm centers.

The mesh was 60×60 stainless steel screen having 0.0075 inch diameter wire with a thin $Cr_2O_3$ dielectric coating. Spacing between the wires of the mesh was 0.42 mm which was non-symmetric with respect to the hole spacing.

The packed-bed reactor was similar to Heath et al. (U.S. Pat. No. 5,254,231) having a 1-inch diameter quartz cylinder surrounded by a conductive copper electrode in the form of tape or a wire screen. The central electrode was ⅛ inch diameter stainless steel rod. The annular space between the quartz cylinder and the central electrode was filled with 3 mm $ZrO_2$ beads.

Figure 5:
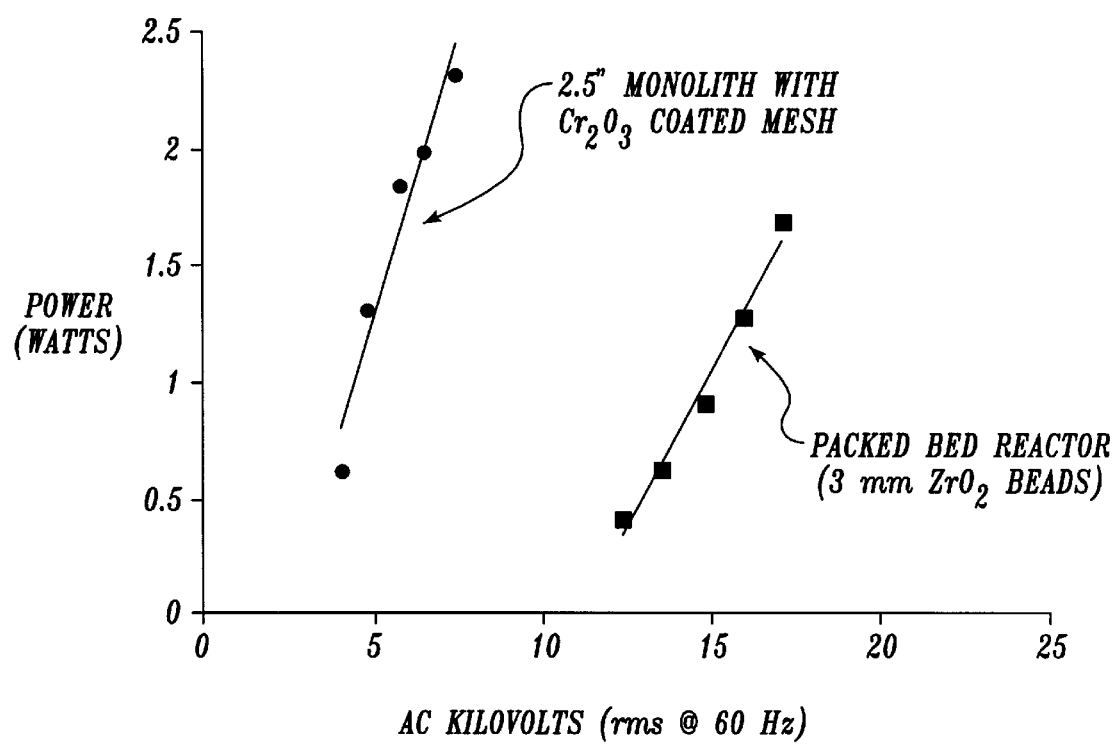
FIG. 5 is a graph of electric power versus electric voltage for comparing a coated mesh to a packed bed reactor.

Results are shown in FIG. 5. The packed-bed reactor required a minimum of about 12 kV to initiate a corona discharge whereas the perforated monolith provided corona discharge from about 3 kV to about 9 kV surprisingly and significantly less than the voltage necessary for the packed bed.

CLOSURE

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. An apparatus for applying a plasma to an exhaust gas, comprising a housing having interior surfaces and containing a first electrode and a second electrode, said first and second electrodes spaced apart with said exhaust gas flowing therebetween, wherein the improvement comprises:
   (a) said electrodes having a coating of dielectric material; and
   (b) said interior surfaces having a coating of a catalyst material.

2. The apparatus as recited in claim 1, further comprising:
   (c) said housing having a plurality of parallel passages through which said exhaust gas flows, said parallel passages open;
   (d) each of said parallel passages having a flow cross section and;
   (e) at least one pair of said electrodes of said first electrode and said second electrode wherein each of said at least one pair of electrodes has a projection extended into or across a portion of said flow cross section, said each electrode attached to said housing.

3. The apparatus as recited in claim 2, wherein said parallel flow passages are holes through a monolith.

4. The apparatus as recited in claim 3, wherein said electrodes are in the form of a mesh placed at opposite ends of said monolith over said holes.

5. The apparatus as recited in claim 4, wherein a geometric relationship between a spacing of said holes and a spacing of elements of said mesh is non-symmetric.

6. The apparatus as recited in claim 2, wherein said parallel flow passages are gaps between parallel members.

7. The apparatus as recited in claim 6, wherein said electrodes are within said parallel members.

8. The apparatus as recited in claim 7, wherein said electrodes are arranged in an open tooth design.

9. The apparatus as recited in claim 2, further comprising a plurality of housings placed in parallel in a flow passage so that the exhaust gas passes alternately through a discharge zone and a discharge free zone.

10. The apparatus as recited in claim 1, wherein said dielectric coating is a metal oxide wherein the metal of the metal oxide is present in the electrode.

11. The apparatus as recited in claim 10, wherein said electrode is stainless steel and said metal oxide is chrome oxide.

12. The apparatus as recited in claim 1, wherein said dielectric material is selected from the group consisting of metal oxides, fused silica, zeolites, perovskites and combinations thereof.

13. The apparatus as recited in claim 12, wherein said oxides are selected from the group consisting of $ZrO_2$, $TiO_2$, $Cr_2O_3$, and combinations thereof.

14. The apparatus as recited in claim 1 wherein said catalyst material is selected from the group consisting of oxides, nitrides, titanates, and zeolites.

15. A method of reducing combustion exhaust, comprising the steps of:
(a) providing a housing having interior surfaces and containing a first electrode and a second electrode, said first and second electrodes spaced apart for said exhaust gas flowing therebetween;
(b) coating said electrodes with a coating of dielectric material;
(c) coating said interior surfaces with a coating of a catalyst material; and
(d) applying a voltage to said electrodes, said voltage less than 12 kV.

16. The method as recited in claim 15, wherein said housing has a plurality of parallel passages through which said exhaust gas flows, said parallel passages open, each of said parallel passages having a flow cross section and at least one pair of said electrodes of said first electrode and said second electrode wherein each of said at least one pair of electrodes has a projection extended into or across a portion of said flow cross section, said each electrode attached to said housing.

17. The method as recited in claim 16, wherein said parallel flow passages are holes through a monolith.

18. The method as recited in claim 17, wherein said electrodes are in the form of a mesh placed at opposite ends of said monolith over said holes.

19. The method as recited in claim 18, wherein a geometric relationship between a spacing of said holes and a spacing of elements of said mesh is non-symmetric.

20. The method as recited in claim 16, wherein said parallel flow passages are gaps between parallel members.

21. The method as recited in claim 20, wherein said electrodes are within said parallel members.

22. The method as recited in claim 21, wherein said electrodes are arranged in an open tooth design.

23. The method as recited in claim 16, further comprising a plurality of housings placed in parallel in a flow passage so that the exhaust gas passes alternately through a discharge zone and a discharge free zone.

24. The method as recited in claim 15, wherein said dielectric coating is a metal oxide wherein the metal of the metal oxide is present in the electrode.

25. The method as recited in claim 24, wherein said electrode is stainless steel and said metal oxide is chrome oxide.

26. The method as recited in claim 15, wherein said dielectric material is selected from the group consisting of metal oxides, fused silica, zeolites, perovskites and combinations thereof.

27. The method as recited in claim 26, wherein said oxides are selected from the group consisting of $ZrO_2$, $TiO_2$, $Cr_2O_3$, and combinations thereof.

28. The method as recited in claim 15 wherein said catalyst material is selected from the group consisting of oxides, nitrides, titanates, and zeolites.

* * * * *